United States Patent
Pani et al.

(10) Patent No.: US 8,254,321 B2
(45) Date of Patent: Aug. 28, 2012

(54) METHOD AND APPARATUS FOR SERVING HIGH SPEED DOWNLINK SHARED CHANNEL CELL CHANGE

(75) Inventors: Diana Pani, Montreal (CA); Christopher R. Cave, Montreal (CA); Paul Marinier, Brossard (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 666 days.

(21) Appl. No.: 12/362,580

(22) Filed: Jan. 30, 2009

(65) Prior Publication Data
US 2009/0196259 A1 Aug. 6, 2009

Related U.S. Application Data

(60) Provisional application No. 61/025,625, filed on Feb. 1, 2008, provisional application No. 61/087,413, filed on Aug. 8, 2008.

(51) Int. Cl.
*H04W 72/00* (2009.01)
*H04W 4/00* (2009.01)

(52) U.S. Cl. ........................................ 370/329; 455/450

(58) Field of Classification Search .......... 455/436–440, 455/442, 450–453; 370/312, 328–332, 335–337, 370/342–344
See application file for complete search history.

(56) References Cited

U.S. PATENT DOCUMENTS

| | | | |
|---|---|---|---|
| 2008/0267061 A1* | 10/2008 | DiGirolamo et al. | 370/216 |
| 2008/0267130 A1* | 10/2008 | Pani et al. | 370/331 |
| 2009/0086756 A1 | 4/2009 | Tseng | |
| 2010/0110988 A1* | 5/2010 | Marinier et al. | 370/328 |
| 2011/0026422 A1* | 2/2011 | Ma et al. | 370/252 |
| 2011/0223917 A1* | 9/2011 | Gao et al. | 455/436 |

FOREIGN PATENT DOCUMENTS

| | | |
|---|---|---|
| EP | 1 773 009 | 4/2007 |
| JP | 2009-089376 A | 4/2009 |
| JP | 2010-526487 A | 7/2010 |
| WO | 2006/035297 | 4/2006 |

OTHER PUBLICATIONS

Samsung, "HSDPA Re-pointing", 3GPP TSG-RAN Meeting #48-bis, R2-052528, (Cannes, France, Aug. 10-Oct. 14, 2005).
Qualcomm Europe, "Enhanced HSDPA Re-pointing Scheme", 3GPP TSG-RAN WG2 Meeting #48bis, R2-052568, (Cannes, France, Oct. 10-14, 2005).

(Continued)

*Primary Examiner* — Thai Hoang
(74) *Attorney, Agent, or Firm* — Condo Roccia LLP (57) ABSTRACT

A method and apparatus for serving high speed downlink shared channel (HS-DSCH) cell change are disclosed. A wireless transmit/receive unit (WTRU) sends a measurement report to a radio network controller (RNC) when a signal strength of a target cell approaches a signal strength of a source cell. The RNC adds the target cell in an active set and sends pre-loaded HS-DSCH configuration information for the target cell to the WTRU. The WTRU sends another measurement report when a signal strength of the target cell exceeds that of the source cell. The WTRU monitors a high speed shared control channel (HS-SCCH) on the target cell based on the pre-loaded HS-DSCH configuration information and decodes an HS-SCCH transmission. The WTRU determines whether a MAC-hs/ehs reset is required and if so resets a MAC-hs/ehs entity prior to receiving an HS-DSCH transmission from the target cell.

17 Claims, 3 Drawing Sheets

OTHER PUBLICATIONS

Qualcomm Europe, "HS-DSCH Serving Cell Change Performance in Urban Canyon Environments", 3GPP TSG-RAN WG2 #60-bis, R2-080371, (Seville, Spain, Jan. 15-19, 2008).

Ericsson, "Introduction of HS-DSCH Cell Change Enhancements", 3GGP TSG-RAN WG2 Meeting #64, R2-087305, (Prague, Czech Republic, Nov. 10-14, 2008).

Third Generation Partnership Project, "Technical Specification Group Radio Access Network; Physical Layer Procedures (FDD) (Release 1999)," 3GPP TS 25.214, V3.12.0, (Mar. 2003).

Third Generation Partnership Project, "Technical Specification Group Radio Access Network; Physical Layer Procedures (FDD) (Release 4)," 3GPP TS 25.214, V4.6.0, (Mar. 2003).

Third Generation Partnership Project, "Technical Specification Group Radio Access Network; Physical Layer Procedures (FDD) (Release 5)," 3GPP TS 25.214, V5.11.0, (Jun. 2005).

Third Generation Partnership Project, "Technical Specification Group Radio Access Network; Physical Layer Procedures (FDD) (Release 6)," 3GPP TS 25.214, V6.11.0, (Dec. 2006).

Third Generation Partnership Project, "Technical Specification Group Radio Access Network; Physical Layer Procedures (FDD) (Release 7)," 3GPP TS 25.214, V7.7.0, (Nov. 2007).

Third Generation Partnership Project, "Technical Specification Group Radio Access Network; Physical Layer Procedures (FDD) (Release 7)," 3GPP TS 25.214, V7.10.0, (Dec. 2008).

Third Generation Partnership Project, "Technical Specification Group Radio Access Network; Physical Layer Procedures (FDD) (Release 8)," 3GPP TS 25.214, V8.0.0, (Nov. 2007).

Third Generation Partnership Project, "Technical Specification Group Radio Access Network; Physical Layer Procedures (FDD) (Release 8)," 3GPP TS 25.214, V8.4.0, (Dec. 2008).

Third Generation Partnership Project, "Technical Specification Group Radio Access Network; High Speed Downlink Packet Access (HSDPA), Overall Description, Stage 2 (Release 5)," 3GPP TS 25.308, V5.7.0, (Dec. 2004).

Third Generation Partnership Project, "Technical Specification Group Radio Access Network; High Speed Downlink Packet Access (HSDPA), Overall Description, Stage 2 (Release 6)," 3GPP TS 25.308, V6.4.0, (Mar. 2007).

Third Generation Partnership Project, "Technical Specification Group Radio Access Network; High Speed Downlink Packet Access (HSDPA), Overall Description, Stage 2 (Release 7)," 3GPP TS 25.308, V7.5.0, (Dec. 2007).

Third Generation Partnership Project, "Technical Specification Group Radio Access Network; High Speed Downlink Packet Access (HSDPA), Overall Description, Stage 2 (Release 7)," 3GPP TS 25.308, V7.9.0, (Dec. 2008).

Third Generation Partnership Project, "Technical Specification Group Radio Access Network; High Speed Downlink Packet Access (HSDPA), Overall Description, Stage 2 (Release 8)," 3GPP TS 25.308, V8.0.0, (Dec. 2007).

Third Generation Partnership Project, "Technical Specification Group Radio Access Network; High Speed Downlink Packet Access (HSDPA), Overall Description, Stage 2 (Release 8)," 3GPP TS 25.308, V8.4.0, (Dec. 2008).

Third Generation Partnership Project, "Technical Specification Group Radio Access Network; Radio Resource Control (RRC), Protocol Specification (Release 8)," 3GPP TS 25.331, V8.1.0, (Dec. 2007).

Third Generation Partnership Project, "Technical Specification Group Radio Access Network; Radio Resource Control (RRC), Protocol Specification (Release 8)," 3GPP TS 25.331, V8.5.0, (Dec. 2008).

3rd Generation Partnership Project (3GPP), R2-080234, "Reset procedure for RLC", Ericsson, Nokia Corporation, Nokia Siemens Networks, NTT Docomo, Inc., 3GPP TSG-RAN WG #60bis, Nov. 14, 2007, 4 pages.

* cited by examiner

METHOD AND APPARATUS FOR SERVING HIGH SPEED DOWNLINK SHARED CHANNEL CELL CHANGE

CROSS REFERENCE TO RELATED APPLICATIONS

This application claims the benefit of U.S. provisional application Nos. 61/025,625 filed Feb. 1, 2008 and 61/087,413 filed Aug. 8, 2008, which are incorporated by reference as if fully set forth.

FIELD OF INVENTION

This application is related to wireless communications.

BACKGROUND

High speed downlink packet access (HSDPA) is a feature introduced in Release 5 of the third generation partnership project (3GPP) specification. HSDPA achieves maximum spectral efficiency using three key concepts: adaptive modulation and coding (AMC), fast physical layer retransmissions by implementing hybrid automatic repeat request (HARQ), and fast Node B scheduling.

Handover is a process in which a wireless transmit/receive unit (WTRU) switches from one cell to another without service interruption. When a handover occurs, the WTRU needs to switch to a new serving HS-DSCH cell (target cell) and stop communicating with the old serving HS-DSCH cell (source cell). This procedure is also called serving HS-DSCH cell change.

A WTRU continuously monitors signal strength of neighboring cells and a serving HS-DSCH cell. When a signal strength measured on a common pilot channel (CPICH) of a neighboring cell exceeds that of the serving cell, (i.e., Event 1D), the WTRU sends a radio resource control (RRC) measurement report to a radio network controller (RNC) to report the change of the best cell. The measurement report triggered by Event 1D contains the measured value and the cell identity (ID).

Upon reception of the event 1D measurement report, the RNC makes a decision to perform a handover to a target cell. A serving radio network controller (SRNC) requests a controlling radio network controller (CRNC) to allocate HS-DSCH resources for the WTRU, (such as HS-DSCH radio network temporary identity (H-RNTI), high speed shared control channel (HS-SCCH) codes, HARQ resources, etc.), in the target cell via radio network subsystem application part (RNSAP) and Node B application part (NBAP) messages. Once the HS-DSCH resources are reserved the CRNC provides all the information to the SRNC which in turn sends an RRC message to the WTRU. The RRC message that may be used to indicate a serving HS-DSCH cell change may include physical channel reconfiguration, transport channel reconfiguration, radio bearer reconfiguration, active set update, or the like. The RRC message provides the WTRU with the radio access parameters required for the WTRU to start monitoring the target cell. In addition, the RRC message may provide an activation time at which the handover should take place.

The handover may be either synchronized or unsynchronized. In an unsynchronized handover, the network and the WTRU do not activate the resources and switch at the same time. The activation time for the WTRU is set to "now". This reduces the delays associated with the handover procedure. However, it increases the probability of data loss.

In a synchronized handover, the network and the WTRU perform the change of resources simultaneously. However, the network has to set the activation time conservatively to account for any kind of delays, such as scheduling delay, retransmissions, configuration time, etc. Therefore, even though the synchronized handover minimizes data losses, it results in longer delays.

Conventionally, the RRC handover message is sent to the WTRU via the source Node B. The delay associated with the serving HS-DSCH cell change may cause the RRC handover message to fail, resulting in an unacceptable rate of dropped calls.

Several proposals have been made to optimize the serving HS-DSCH cell change procedure. In accordance with the proposals, a WTRU and a Node B may be pre-loaded, (i.e., pre-configured), with the HS-DSCH configuration information, i.e. target cell pre-configuration.

Target cell pre-configuration adds robustness to the serving HS-DSCH cell change procedure by allowing the network to send the serving HS-DSCH cell change command either over the source cell and/or the target cell using the HS-SCCH. The target cell pre-configuration is provided to the WTRU via an active set update procedure. More specifically, when a cell is added to the active set, (i.e., event 1A or 1C is triggered), the network sends an active set update message to the WTRU, which, in addition to the dedicated physical channel information, includes the HS-DSCH serving cell information of the new cell, (such as the H-RNTI, HS-DSCH, etc.).

When an event 1D is triggered and the WTRU transmits a measurement report to request a serving cell change to the target cell, the WTRU starts to monitor the HS-SCCH of the target cell (using the target cell pre-configured information) in addition to the HS-SCCH set in the source cell. The network may then send an HS-SCCH in the target cell to trigger a serving cell change. Upon reception of the HS-SCCH on the target cell the WTRU executes the HS-DSCH serving cell change to this target cell.

In the conventional serving HS-DSCH cell change procedure, the WTRU performs a MAC-hs or MAC-ehs reset when an inter-Node B handover occurs, which is explicitly indicated to the WTRU from the network. The network signals to the WTRU if a MAC-hs/ehs reset is required via a MAC-hs/ehs reset indicator in the handover message. If the MAC-hs/ehs indicator is set, the WTRU performs a MAC-hs/ehs reset. Otherwise, a MAC-hs/ehs reset is not performed. With the introduction of the new changes in accordance with the above proposals, some problems may occur.

First, when Event 1D occurs (change of the best cell), the WTRU starts monitoring an HS-SCCH in the target cell while still monitoring an HS-SCCH(s) in the source cell. If an HS-SCCH order is received from the target cell confirming change of serving cell the WTRU has no method of determining whether a MAC-ehs or MAC-hs reset is required. This is due to the fact that the target HS-SCCH does not contain an explicit indicator to order the WTRU to perform a reset, as is done with the RRC handover command. A reset will be required if the network performed an inter-Node B handover or an intra-Node B handover whereby the MAC-hs or MAC-ehs context is reset on the network side. The WTRU has no method of determining that such a reset has been performed on the network side. A MAC-ehs or MAC-hs reset procedure comprises resetting the transmission sequence number (TSN) values to zero, flushing the hybrid automatic repeat request (HARQ) buffers, etc. If the WTRU does not perform a reset the WTRU will not be synchronized with the network, thus resulting in potential loss of data.

In addition, when a handover occurs the WTRU switches to the target cell to receive downlink data traffic. However, it is unclear what happens with the uplink traffic and how the WTRU is assigned the uplink resources of the target cell. According to the current 3GPP RRC specification, the serving HS-DSCH cell and the serving E-DCH cell have to be identical. Therefore, efficient methods to perform the handover in the uplink must also be defined.

Lastly, the network is not aware whether the WTRU supports the fast optimized handovers. Therefore, the network may start transmitting the handover message over the target cell, but the WTRU cannot receive it since the WTRU does not support such capability. This would cause the HS-DSCH cell change to fail and thus the WTRU would have to fall to CELL_FACH and initiate a cell reselection to the target cell.

SUMMARY

A method and apparatus for serving HS-DSCH cell change are disclosed. A WTRU sends a measurement report to an RNC when a signal strength of a target cell approaches a signal strength of a source cell. The RNC adds the target cell in an active set and sends pre-loaded HS-DSCH configuration information for the target cell to the WTRU. The WTRU sends another measurement report when a signal strength of the target cell exceeds that of the source cell. The WTRU monitors an HS-SCCH on the target cell based on the pre-loaded HS-DSCH configuration information and decodes an HS-SCCH transmission from the target cell. The WTRU makes a determination as to whether or not a MAC-hs/ehs entity needs to be reset. The WTRU may reset the MAC-hs/ehs entity if a configuration parameter indicating to perform a MAC-hs/ehs reset is included in the pre-loaded HS-DSCH configuration information and is set to TRUE, or if the configuration parameter is not included or is not set to TRUE, but if transmit power control (TPC) combination indexes (optionally enhanced dedicated channel (E-DCH) relative grant channel (E-RGCH) combination indexes) of the source cell and the target cell are different. The WTRU may reset the MAC-hs/ehs entity if it is detected that a Node B that controls the target cell and the source cell support MAC-hs/ehs preservation. Alternatively, E-DCH configuration information for the target cell may be pre-loaded along with the pre-loaded HS-DSCH configuration information or may be provided in a handover command. The HS-DSCH transmission including a handover command may be transmitted using common HS-DSCH resources.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "WTRU" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "Node B" includes but is not limited to a base station, a site controller, an access point (AP), or any other type of interfacing device capable of operating in a wireless environment. Hereinafter, the terminology "MAC-hs/ehs" will be used to refer to either MAC-hs or MAC-ehs.

Where referred to hereafter decoding of HS-SCCH on the target cell, or target cell HS-SCCH refers to an HS-SCCH order sent by the target cell as an indication that the WTRU may perform an HS-DSCH serving cell change to the target cell.

Figure 1:
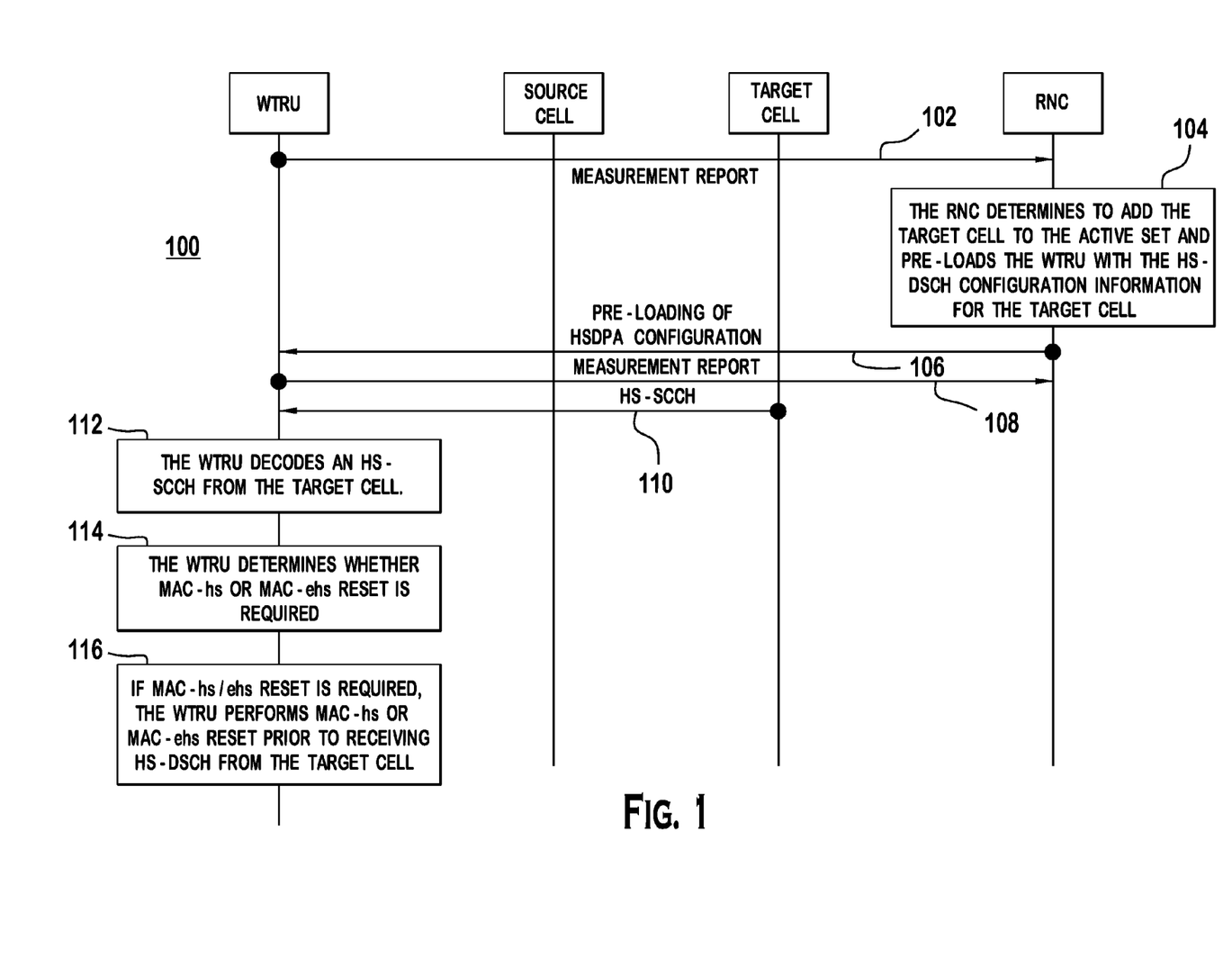
FIG. 1 is a signaling diagram of an example process in accordance with one embodiment.

In accordance with one embodiment, in order to ensure that a WTRU successfully receives data from a target cell after decoding an HS-SCCH and performs the serving cell change, the WTRU performs a MAC-hs/ehs reset prior to receiving data on an associated HS-PDSCH over the target cell. FIG. 1 is a signaling diagram of an example process 100 in accordance with one embodiment. A WTRU sends a measurement report to an RNC when a signal strength of a target cell approaches a signal strength of a serving cell (step 102). The RNC determines to add the target cell to the active set and pre-loads the WTRU with the HS-DSCH configuration information for the target cell (step 104). The WTRU receives the pre-loaded HS-DSCH configuration information for the target cell and stores the pre-loaded HS-DSCH configuration information in a memory (step 106). The WTRU sends another measurement report (Event 1D report) when a signal strength of the target cell exceeds that of the source cell (step 108). The WTRU then monitors an HS-SCCH on the target cell in addition to the HS-SCCH(s) on the source cell based on the pre-loaded HS-DSCH configuration information (step 110). The WTRU decodes the HS-SCCH (i.e., HS-SCCH order) on the target cell (step 112). The WTRU makes a determination regarding whether or not to perform a MAC-hs/ehs reset (step 114). If the MAC-hs/ehs reset is required, the WTRU resets a MAC-hs/ehs entity prior to receiving an HS-DSCH transmission from the target cell (step 116). It is understood that the MAC-ehs/hs reset will be performed at the time of the serving cell change. If an activation time is specified the MAC-hs/ehs reset will be performed at the given activation time, when the serving cell change is performed and the WTRU reconfigures to the target cell.

The trigger of the MAC-hs/ehs reset may be the reception of the first HS-SCCH from the target cell with an assigned H-RNTI. The WTRU may be assigned an H-RNTI for the target cell (a target H-RNTI) as part of the preloaded HS-DSCH configuration information and may monitor two H-RNTIs simultaneously, (i.e., monitors an HS-SCCH on the target cell with the target H-RNTI and an HS-SCCH on the source cell with an H-RNTI for the source cell (source H-RNTI)).

Alternatively, the WTRU may monitor an HS-SCCH on the target cell with a source H-RNTI. In this case, the network must ensure that no other WTRU in the target cell is assigned the same H-RNTI that is assigned to the WTRU in the source cell, (i.e., serving cell).

Alternatively, the WTRU may monitor a common H-RNTI. The common H-RNTI may be obtained from the broadcast control channel (BCCH) using a similar method as in enhanced CELL_FACH. The network may use the common H-RNTI in the target cell to transmit the handover message to the WTRU. The network may assign a common H-RNTI to a group of WTRUs as part of the pre-loaded HS-DSCH configuration information. The WTRU may monitor this common H-RNTI in the target cell and change it to a dedicated H-RNTI upon reception of the handover command over the target cell.

The WTRU may perform a full MAC-hs/ehs reset upon decoding the target cell HS-SCCH as if a MAC-hs/ehs reset indicator was set. Alternatively, the WTRU may perform a partial MAC-hs/ehs reset. In this case, the WTRU may only reset the TSN and reinitialize reordering variables and timers of the MAC-hs/ehs queue to which a logical channel carrying a signaling radio bearer (SRB) is mapped. After decoding the HS-SCCH, the WTRU resets the TSN, variables, and timers of the queue configured with the SRB carrying the handover command. In case only one MAC-hs/ehs queue is reset, it is possible that the trigger for the partial MAC-hs/ehs reset is the transmission of an event 1D measurement report by the WTRU instead of the detection of the HS-SCCH on the target cell. After reception of the handover command the WTRU may reset the whole MAC-hs/ehs entity if the MAC-hs/ehs reset indicator is set.

In pre-Release 8 3GPP systems, if an intra-Node B handover occurs and the Node B supports MAC-hs/ehs preservation, the WTRU does not need to perform a MAC-hs/ehs reset since both the source cell and the target cell are controlled by the same Node B. MAC-hs/ehs preservation refers to a Node B or network that is capable of transferring or sharing the MAC-hs/ehs context and therefore does not have to reset any MAC-hs/ehs variables and flush any buffers. If a serving cell change occurs within cells that support MAC-hs/ehs preservation, the WTRU is not required to perform a MAC-hs/ehs reset. However, if the WTRU bases the MAC-hs/ehs reset on the reception of the target cell HS-SCCH, the WTRU may always reset the MAC-hs/ehs entity regardless of the type of handover even though it is not necessary. This may also result in a de-synchronization between the WTRU and the network, if the Node B does not re-initialize the MAC-ehs/hs context, but the WTRU does.

The WTRU may use one or a combination of the following methods to determine whether a MAC-hs/ehs reset is required when receiving the target cell HS-SCCH on the target cell. The WTRU may be assigned two or more HS-SCCH codes to monitor in the target cell. The signal to perform a MAC-hs/ehs reset may be based on the HS-SCCH code used to schedule the first transmission. For example, if the network uses the first code a MAC-hs/ehs reset is performed. Otherwise, a MAC-hs/ehs reset is not performed. The network may configure the WTRU with this information or the WTRU is preconfigured to know which code will be used to indicate a MAC reset.

Alternatively, the network may use the sub-frame numbers to indicate if a MAC-hs/ehs reset is required. For example, if the WTRU detects the target cell HS-SCCH on an even numbered sub-frame the WTRU performs a MAC-hs/ehs reset, and if the WTRU detects the target cell HS-SCCH on an odd numbered sub-frame, the WTRU does not perform a MAC-hs/ehs reset.

Alternatively, an HS-SCCH order may be used to indicate the WTRU to perform a MAC-hs/ehs reset. An HS-SCCH order may be used to indicate a serving cell change and the need to perform a MAC-hs/ehs reset, and another HS-SCCH order may be used to indicate just a serving cell change without a MAC-hs/ehs reset. Alternatively, a specific HS-SCCH order may be used to order a MAC-hs/ehs reset.

Alternatively, the WTRU may use information from the radio links of the cells in the active set in determining whether a MAC-hs/ehs reset is required. The WTRU may optionally use enhanced dedicated channel (E-DCH) relative grant channel (E-RGCH) information. If an E-RGCH combination index of the target cell is equal to that of the current serving E-DCH cell, (i.e., the source cell), the source cell and the target cell belong to the same Node B, (i.e., the cells belong to the serving E-DCH radio link set (RLS)), and a MAC-hs/ehs reset is not required, unless otherwise indicated in the handover command. If the target cell does not belong to the serving E-DCH RLS, the WTRU may perform a MAC-hs/ehs reset. Optionally, the WTRU may perform a MAC-hs/ehs reset of the queue which is configured for the logical channel carrying an SRB, (i.e., partial MAC-hs/ehs reset). Alternatively, a TPC combination index may be used. If a TPC combination index of the target cell is the same as that of the source cell, the cells belong to the same Node B and a MAC-hs/ehs reset may not be performed.

Alternatively and additionally, a new configuration parameter, (i.e., an information element (IE)), may be added to the list of pre-loaded HS-DSCH configuration information that is provided as part of the active set update procedure. This new configuration parameter indicates whether a MAC-hs/ehs reset should be performed when a serving cell change is performed to this cell.

For example, the new configuration parameter may be in the form of a "MAC-hs/ehs reset index", with an integer value from (0 . . . 5). For the cells that belong to the same Node B and support MAC-hs/ehs preservation, the "MAC-hs/ehs reset index" is set to the same value, and the radio links with the same MAC-hs/ehs reset index have the ability to perform MAC-hs/ehs preservation when a serving cell change occurs between them. When a serving cell change is triggered and the MAC-hs/ehs reset indexes of the source and the target cells are the same, the WTRU does not perform a MAC-hs/ehs reset. If the MAC-hs/ehs reset indexes of the source and target cells are different, the WTRU performs a MAC-hs/ehs reset upon reception of an HS-SCCH order or upon decoding the first HS-SCCH with the pre-configured H-RNTI on the target cell.

Alternatively, a new configuration parameter may be provided to indicate whether the radio links belonging to the same Node B support MAC-hs/ehs preservation. For example, a one bit indicator, (a new IE), may be included in an RRC message that pre-loads the required HS-DSCH configuration information. This new information element will be referred to as "serving cell MAC reset indicator." The serving cell MAC reset indicator indicates whether the current Node B supports MAC-hs/ehs preservation, (i.e., whether a MAC-hs/ehs reset should be performed). If the serving cell MAC reset indicator in the pre-loaded configuration information is set to TRUE, the WTRU performs a MAC-hs/ehs reset. If the serving cell MAC reset indicator is not set to TRUE, the WTRU combines this information with the radio link information of the E-RGCH combination index or the TPC combination index. More specifically, the WTRU uses the TPC combination index (or optionally the E-RGCH combination index) to determine if the MAC-ehs/hs reset should be performed. If both the source cell and the target cell have the same TPC combination index (or optionally the same E-RGCH combination index) the radio links belong to the same radio link set, (i.e., same Node B) and if the serving cell MAC reset indicator is not set to TRUE, the WTRU determines that the Node Bs support MAC-hs/ehs preservation and thus no MAC-hs/ehs reset is required. If the serving cell MAC reset indicator indicates that the Node B supports MAC-hs/ehs preservation, (i.e., the serving cell MAC reset indicator is not set to TRUE), and if the source cell and the target cell have the same TPC combination index (optionally E-RGCH combination index), the WTRU does not perform a MAC-hs/ehs reset. If the serving cell MAC reset indicator indicates that the Node B does not support MAC-hs/ehs preservation, (i.e., not set to TRUE), and if the source cell and the target cell have different TPC combination indexes (optionally E-RGCH combination indexes), (i.e., belong to different Node Bs), the WTRU performs a MAC-hs/ehs reset upon reception of an HS-SCCH order (indicating a serving cell change).

Figure 2:
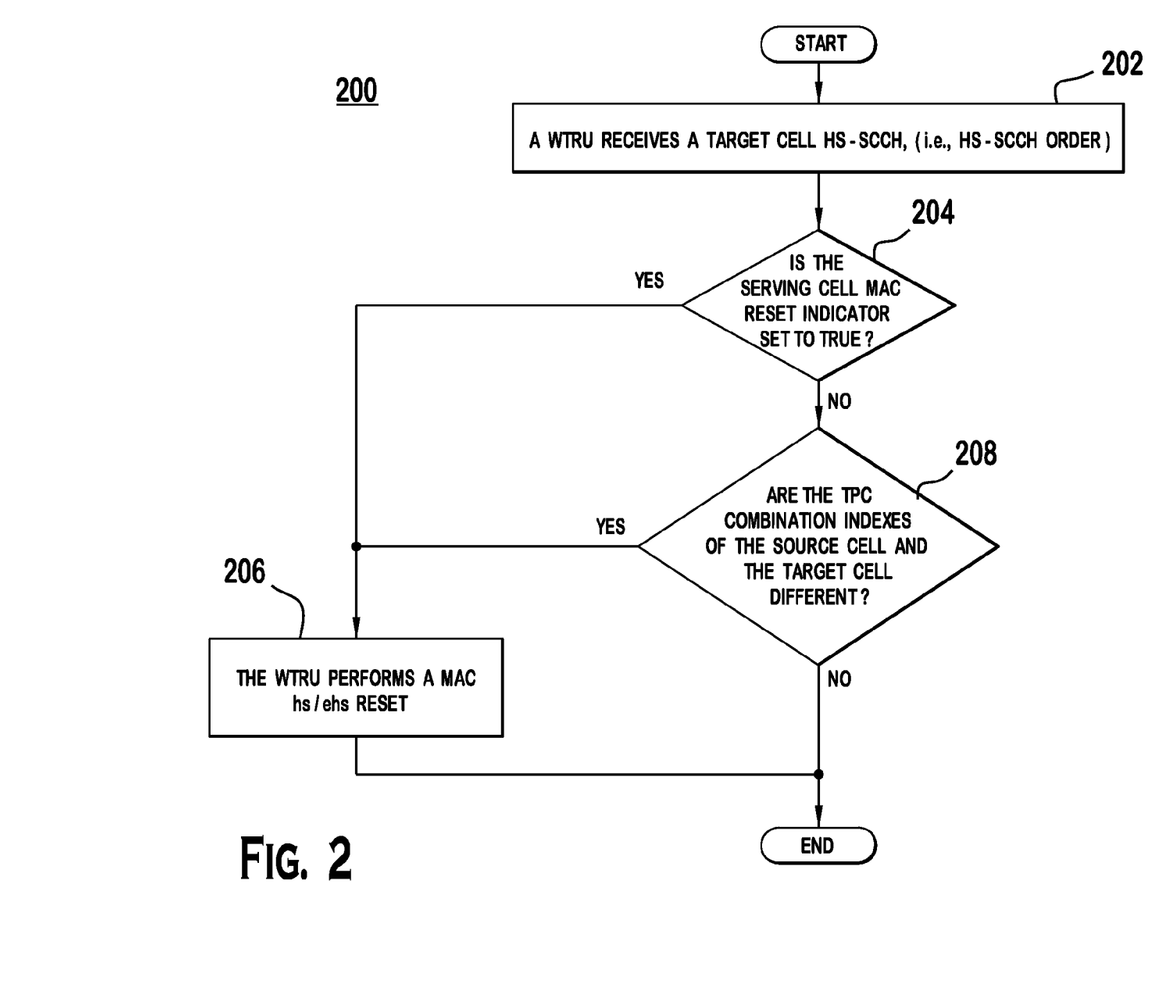
FIG. 2 is a flow diagram of an example process for performing a MAC-hs/ehs reset.

FIG. 2 is a flow diagram of a process for performing a MAC-hs/ehs reset in accordance with the embodiment disclosed above. A WTRU receives a target cell HS-SCCH, (i.e., HS-SCCH order), (step 202). The HS-SCCH order is passed to higher layers. It is determined whether the serving cell MAC reset indicator is set to TRUE (step 204). If the serving cell MAC reset indicator is set to TRUE, the WTRU performs a MAC-hs/ehs reset (step 206). If the serving cell MAC reset indicator is not set to TRUE, it is determined whether TPC combination indexes (optionally E-RGCH combination indexes) of the source cell and the target cell are different (step 208). If so, the WTRU performs a MAC-hs/ehs reset (step 206). If not, the WTRU does not perform a MAC-hs/ehs reset.

In accordance with another embodiment, the WTRU does not perform a MAC reset when reading an HS-SCCH on the target cell, but the network ensures that the data from the target cell is not discarded by using the next TSN expected by the WTRU. This is performed by transferring the MAC-hs/ehs information from the source cell to the target cell. The source cell may only transfer the next TSN to be used for the queue configured with the SRB containing the handover command and possibly other variables such as T1 timer values, etc. Alternatively, the information of all configured queues may be transferred to the target cell. This will ensure that the WTRU does not discard the handover command.

In accordance with another embodiment, the WTRU instantiates a new MAC-hs/ehs context, (i.e., TSN values for each reordering queues, reordering queues, etc.), as soon as the WTRU is provided with the H-RNTI to use in the target cell, while the MAC-hs/ehs context in the source cell is still active. During a short period of time, the WTRU maintains two MAC-hs/ehs contexts, one for the source cell and the other for the target cell. To facilitate hardware implementation, the physical resources, (e.g., memory), may be shared between both contexts during that time. The WTRU may remove the MAC-hs/ehs context of the source cell and allocate all physical resources to the MAC-hs/ehs context of the target cell when the WTRU is instructed to perform a MAC-hs/ehs reset by RRC signaling, or after the WTRU decodes its H-RNTI on the HS-SCCH on the target cell.

In accordance with another embodiment, uplink E-DCH configuration information for the target cell is also pre-load simultaneously with the HS-DSCH configuration information. The E-DCH configuration information may include, but is not limited to, E-DCH absolute grant channel (E-AGCH) information, E-DCH radio network temporary identity (E-RNTI), transmission time interval (TTI), a serving grant value, reference E-DCH transport format combination indexes (E-TFCIs), E-DCH HARQ indicator channel (E-HICH) information, and E-RGCH information. Other information such as E-DCH dedicated physical control channel (E-DPCCH)-to-dedicated physical channel (DPCCH) power offset, E-DCH minimum set E-TFCI and other parameters may be provided simultaneously or be provided with the handover command. It should be noted that if all required information is provided as part of the pre-configured resources, the network may not even need to send a handover command. More specifically, the WTRU may perform a successful E-DCH and HS-DSCH serving cell change upon reception of an HS-SCCH order from the target cell, without the need to successfully decode the RRC handover command.

Alternatively, the E-DCH configuration information for the target cell may not be preloaded with the HS-DSCH configuration information, but may be provided in the handover command sent to the WTRU over the target cell. In order to carry on this procedure, the behavior of the WTRU has to be modified. The WTRU may perform the following steps during the handover procedure. When event 1D is triggered, the uplink transmission continues normally with the source cell, (i.e., the serving E-DCH cell), while the target cell is in handover. At the time the WTRU decodes the HS-SCCH on the target cell, the WTRU immediately stops uplink transmission in the source cell until the handover command is processed and the target cell is configured as a serving E-DCH cell. Alternatively, the WTRU continues transmitting data in the uplink to the source cell even though the HS-SCCH is decoded in the downlink on the target cell. The WTRU switches to the target cell once the handover command is received and the E-DCH information is decoded. The change may take place as soon as the configuration is completed, (i.e., the activation time is set to "now"), or at the given activation time. This would require that a serving E-DCH cell and a serving HS-DSCH cell are not identical at all times. A slight delay may occur until the two become identical. Alternatively, a serving E-DCH cell and a serving HS-DSCH cell are not considered as changed until the handover command is received.

In accordance with another embodiment, the WTRU may trigger the transmission of the scheduling information (SI) as soon as an HS-SCCH is decoded on the target cell. This will allow the target cell to schedule the WTRU appropriately. The SI may be sent as soon as the HS-SCCH is decoded, or only after the successful reception of the first MAC PDU over the target cell. Alternatively, the SI may be sent as soon as the uplink is properly configured. The network may use the reception of the SI as an indication that the handover has been successful.

Additionally, the WTRU may also start fast channel quality indicator (CQI) reporting as soon as the first HS-SCCH is received. The frequency of the CQI report may be more frequent than the configured CQI reporting frequency. For example, the CQI may be sent X times on every N consecutive TTIs (where $n \geq 1$) and then it may fall back to normal behavior. Alternatively, the CQI may be sent more frequently for a short configured period of time or until the handover command is successfully received. The network may schedule the first HS-SCCH with the assigned H-RNTI as a trigger for the WTRU to immediately start transmitting the CQI over the HS-DPCCH. Once the target Node B has received the first CQI or X CQI reports it may start data transmission in the downlink.

Alternatively, the WTRU may use the reception of the E-AGCH with its E-RNTI over the target cell as an indication that the handover has taken place on the network side, and thus switch to the target cell to monitor the HS-SCCH on the target cell.

In accordance with another embodiment, new WTRU capability information is added to an RRC message, (e.g., RRC connection request message), to indicate that the WTRU supports optimized HS-DSCH serving cell change. If the WTRU does not support it, the network does not pre-load the HS-DSCH or E-DCH configuration information and carry on the procedure. Alternatively, the WTRU implicitly knows not to perform the procedure if the pre-loaded HS-DSCH configuration information or E-DCH configuration information is not provided by the network. Alternatively, the optimized HS-DSCH serving cell change procedure may be a mandatory feature for all WTRUs.

In accordance with another embodiment, the WTRU may use the common HS-DSCH resources broadcasted on system information blocks (SIBs) or common resources provided to the WTRU as part of the active set update procedure to receive the HS-SCCH in the target cell. The common resources provided to the WTRU via RRC signaling may be a common set of resources that the WTRU may use for any scenarios where the serving cell change occurs to a target cell for which the WTRU does not have pre-configured resources or the cell is not even in the WTRU's active set. The network sends a handover command over the target cell or a handover indication using the common resources either selected from the SIBs or the one assigned by the network to the WTRU. Only the WTRUs which have reported an event 1D or event 1A or even 1C measurement report are configured to listen to the common resource provided by the network in the target cell. Due to the fact that a common resource is used, several WTRUs may be listening to the HS-SCCH code with the same common H-RNTI. Therefore, it is required to identify the destination of the RRC message. For the identification, a UTRAN radio network temporary identity (U-RNTI) of the WTRU may be added to the MAC header or alternatively to the RRC handover command. Alternatively, other WTRU IDs such as H-RNTI, cell radio network temporary identity (C-RNTI), or E-RNTI may be appended to the MAC header.

Upon reception of the handover command over the target cell, if the command is for the WTRU, the WTRU reconfigures the downlink and uplink resources according to the information provided in the handover message. This method would allow the network to allocate common resources to the WTRUs without wasting resources for all WTRUs that have the cell as part of the non-serving active set.

Figure 3:
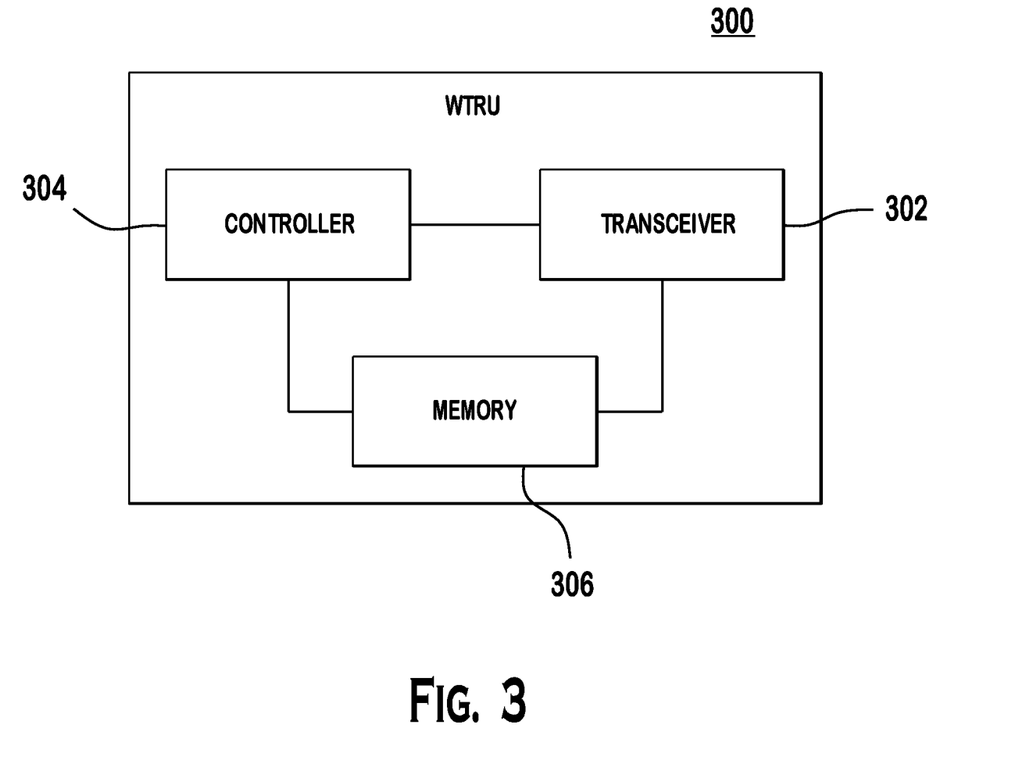
FIG. 3 is a block diagram of an example WTRU.

FIG. 3 is a block diagram of an example WTRU 300. The WTRU 300 includes a transceiver 302, a controller 304 and a memory 306. The WTRU 300 is configured to perform serving HS-DSCH cell change in accordance with embodiments disclosed above. The pre-loaded HS-DSCH configuration information and/or the pre-loaded E-DCH configuration information may be stored in the memory 306. The transceiver 302 is configured to monitor an HS-SCCH on the target cell based on the pre-loaded HS-DSCH configuration information and decode an HS-SCCH transmission from the target cell. The controller 304 is configured to control the transceiver to implement any embodiments disclosed above. For example, the controller 304 is configured to reset a MAC-hs/ehs entity prior to receiving an HS-DSCH transmission from the target cell upon successful decoding of the HS-SCCH on the target cell if a configuration parameter indicating to perform a MAC-hs/ehs reset is included in the pre-loaded HS-DSCH configuration information and is set to TRUE, or if the configuration parameter is not included or is not set to TRUE, but if TPC combination indexes of the source cell and the target cell are different.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method for serving high speed downlink shared channel (HS-DSCH) cell change, the method comprising:
sending a first measurement report when a signal strength of a target cell approaches a signal strength of a source cell;
receiving pre-loaded target cell HS-DSCH configuration information;
storing the pre-loaded target cell HS-DSCH configuration information in a memory;
sending a second measurement report when a signal strength of the target cell exceeds that of the source cell;
monitoring a high speed shared control channel (HS-SCCH) on the target cell based on the pre-loaded target cell HS-DSCH configuration information;
receiving an HS-SCCH order from the target cell indicating change of an HS-DSCH serving cell;
determining whether a Medium Access Control High Speed/Enhanced High Speed (MAC-hs/ehs) reset is required; and
resetting a MAC-hs/ehs entity if it is determined that an MAC-hs/ehs reset is required.

2. The method of claim 1 wherein the pre-loaded target cell HS-DSCH configuration information includes a configuration parameter indicating whether an MAC-hs/ehs reset is required.

3. The method of claim 2 wherein the MAC-hs/ehs entity is reset if the configuration parameter is set to TRUE.

4. The method of claim 2 further comprising:
determining a transmit power control (TPC) combination index of the source cell and a TPC combination index of the target cell if the configuration parameter is not set to TRUE; and
resetting the MAC-hs/ehs entity if the TPC combination indexes are different.

5. The method of claim 2 further comprising:
determining an enhanced dedicated channel (E-DCH) relative grant channel (E-RGCH) combination index of the target cell and an E-RGCH combination index of the source cell if the configuration parameter is not included in the pre-loaded target cell HS-DSCH configuration information; and
resetting the MAC-hs/ehs entity if the E-RGCH combination indexes are different.

6. The method of claim 2 further comprising:
determining an enhanced dedicated channel (E-DCH) relative grant channel (E-RGCH) combination index of the target cell and tan E-RGCH combination index of the source cell if the configuration parameter is not set to TRUE; and
resetting the MAC-hs/ehs entity if the E-RGCH combination indexes are different.

7. The method of claim 1 further comprising:
receiving pre-loaded enhanced dedicated channel (E-DCH) configuration information for the target cell along with the pre-loaded target cell HS-DSCH configuration information and storing the pre-loaded E-DCH configuration information in the memory; and
performing an E-DCH serving cell change using the pre-loaded E-DCH configuration information when the HS-SCCH order is received in the target cell.

8. The method of claim 7 wherein the pre-loaded E-DCH configuration information includes at least one of an E-DCH radio network temporary identity (E-RNTI), E-DCH absolute grant channel (E-AGCH) information, reference E-DCH transport format combination indexes (E-TFCIs), E-DCH hybrid automatic repeat request (HARM) indicator channel (E-HICH) information, and E-DCH relative grant channel (E-RGCH) information.

9. A wireless transmit/receive unit (WTRU) for serving high speed downlink shared channel (HS-DSCH) cell change, the WTRU comprising:
a memory for storing pre-loaded target cell HS-DSCH configuration information;
a transceiver configured to monitor a high speed shared control channel (HS-SCCH) on the target cell based on the pre-loaded target cell HS-DSCH configuration information and decode an HS-SCCH transmission from the target cell; and
a controller configured to determine whether a Medium Access Control High Speed/Enhanced High Speed (MAC-hs/ehs) reset is required when an HS-SCCH order is received from the target cell informing change of an HS-DSCH serving cell, and reset an MAC-hs/ehs entity if it is determined that an MAC-hs/ehs reset is required.

10. The WTRU of claim 9 wherein the pre-loaded target cell HS-DSCH configuration information includes a configuration parameter indicating whether an MAC-hs/ehs reset is required.

11. The WTRU of claim 10 wherein the controller is configured to reset the MAC-hs/ehs entity if the configuration parameter is set to TRUE.

12. The WTRU of claim 10 wherein the controller is configured to determine a transmit power control (TPC) combination index of the source cell and a TPC combination index of the target cell and reset the MAC-hs/ehs entity if the configuration parameter is not set to TRUE and the TPC combination index of the source cell and the TPC combination index of the target cell are different.

13. The WTRU of claim 10 wherein the controller is configured to determine an enhanced dedicated channel (E-DCH) relative grant channel (E-RGCH) combination index of the source cell and an E-RGCH combination index of the target cell and reset the MAC-hs/ehs entity if the configuration parameter is not included in the pre-loaded target cell HS-DSCH configuration information and the E-RGCH combination index of the target cell and the E-RGCH combination index of the source cell are different.

14. The WTRU of claim 10 wherein the controller is configured to determine an enhanced dedicated channel (E-DCH) relative grant channel (E-RGCH) combination index of the source cell and an E-RGCH combination index of the target cell and reset the MAC-hs/ehs entity if the configuration parameter is not set to TRUE and the E-RGCH combination index of the target cell and the E-RGH combination index of the source cell are different.

15. The WTRU of claim 9 wherein the controller is configured to reset the MAC-hs/ehs entity if a Node B that controls the target cell and the source cell does not support MAC-hs/ehs preservation.

16. The WTRU of claim 9 wherein the controller is configured to receive pre-loaded enhanced dedicated channel (E-DCH) configuration information for the target cell along with the pre-loaded target cell HS-DSCH configuration information and perform E-DCH serving cell change using the pre-loaded E-DCH configuration information.

17. The WTRU of claim 9 wherein the controller is configured to receive enhanced dedicated channel (E-DCH) configuration information for the target cell in a handover command and perform serving E-DCH cell change using the E-DCH configuration information.

* * * * *